United States Patent [19]
Neeb et al.

[11] 3,783,268
[45] Jan. 1, 1974

[54] DEVICE FOR MEASURING ACTIVITY CONCENTRATION IN PRIMARY CIRCULATION SYSTEMS OF NUCLEAR REACTORS

[75] Inventors: Karl Heinz Neeb; Herbert Neidl, both of Erlangen; Heinz Stockert, Nurnberg, all of Germany

[73] Assignee: Siemens Aktiengesellschaft, Berlin & Munich, Germany

[22] Filed: July 14, 1971

[21] Appl. No.: 162,437

[30] Foreign Application Priority Data
July 30, 1970 Germany.................. P 20 37 796.2

[52] U.S. Cl. 250/83.3 R, 250/43.5 MR, 250/83.6 FT
[51] Int. Cl. ............................................. G01n 23/12
[58] Field of Search ............... 250/83.6 FT, 83.3 R, 250/43.5 MR

[56] References Cited
UNITED STATES PATENTS

| | | | |
|---|---|---|---|
| 3,200,041 | 8/1965 | Ralfe et al. | 250/83.6 FT X |
| 3,389,251 | 6/1968 | Rainbault et al. | 250/83.6 FT X |
| 3,465,145 | 9/1969 | Leiter | 250/71.5 S |
| 3,116,416 | 12/1963 | Reed | 250/71.5 S X |

*Primary Examiner*—Archie R. Borchelt
*Attorney*—Curt M. Avery et al.

[57] ABSTRACT

A device for measuring the activity concentration of radioactive fission and corrosive products in coolant primary circulation systems of nuclear reactor plants comprises a shunt to the primary circulation stem. The shunt has a closed pipe system comprising stop valves, pressure reducing valve means, exhaust gas container means and filter means. A displaceable high-resolution gamma detector in operative proximity with the closed pipe system measures the contents of the filter means at different points of the pipe system.

9 Claims, 1 Drawing Figure

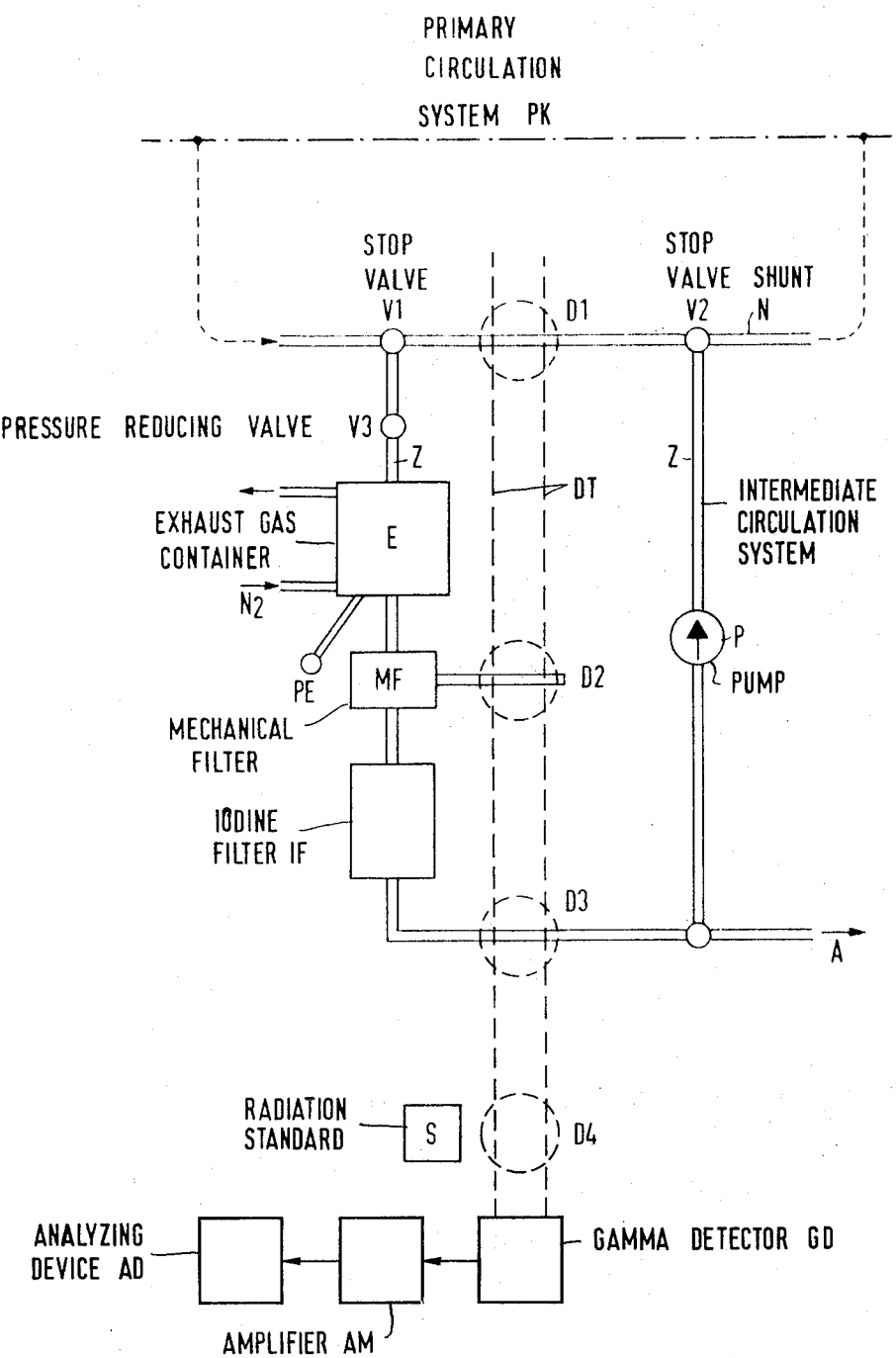

DEVICE FOR MEASURING ACTIVITY CONCENTRATION IN PRIMARY CIRCULATION SYSTEMS OF NUCLEAR REACTORS

DESCRIPTION OF THE INVENTION

The invention relates to a device for measuring the activity concentration in primary circulation systems of nuclear reactors. More particularly, the invention relates to a device for measuring the activity concentration of radioactive fission and corrosion products in coolant primary circulation systems of nuclear reactor plants. Such measurements are absolutely necessary to control the reactor operation, and more particularly for monitoring fuel cell damages which occur and corrosion manifestations.

Prior to the invention, it was customary to obtain samples of the coolant at specific places of the nuclear circulation system and to measure its activity after a suitable chemical preparation in a laboratory with a multichannel gamma spectrometer. This method of operation has a number of disadvantages in practical execution. Thus, it is difficult to derive samples from the lines which are under pressure, without losses of gas. There is also a danger of gas explosions into the ambient air as well as a danger of contaminating with the active coolant the area around the place where samples are taken. Such methods further entail the disadvantage that the persons or attendants who take the samples are sometimes exposed to considerable amounts of radiation. Added to all this is the relatively high cost associated with this type of analysis, as well as the probability of errors connected with the manual operations.

It is an object of our invention to provide a device for measuring the activity concentration in primary circulation systems of nuclear reactors which eliminates the disadvantages of known systems and obviates the need to take samples.

Another object of the invention is to provide a device for measuring the activity concentration in primary circulation systems of nuclear reactors which prevents losses of gas, gas explosions, contamination and exposure of personnel to radiation, and functions with efficiency, effectiveness and reliability.

In accordance with the invention, a device for measuring the activity concentration of radioactive fission and corrosion products in coolant primary circulation systems of nuclear reactor plants comprises a shunt to the primary circulation system having a closed pipe system comprising stop valves, pressure reducing valve means, exhaust gas container means and filter means. A displaceable high-resolution gamma detector in operative proximity with the closed pipe system measures the contents of the filter means at different points of the pipe system.

The gamma detector is a germanicum (lithium) detector.

The pipe system is adjustable in volume at individual measuring points to the expected activity range and to the sensitivity of the detector.

An amplifier and an analyzing device are electrically connected to the gamma detector.

The closed pipe system comprises a continuos path having stop valves for shutting it off and a parallel path extending from one of the stop valves to another and comprising a pressure reducing valve, an exhaust gas container, a mechanical filter, selective filter means including an iodine filter and a pump.

The gamma detector is displaceably mounted on a track for movement to selectable individual measuring points therealong adjacent the filter means and the like in the parallel path. Each of a plurality of holders is at a corresponding one of the measuring points and the gamma detector engages a holder at each measuring point.

A radiation standard for rapid readjustment of the gamma detector is positioned adjacent the track.

In accordance with the invention, the shunt to the primary circulation system is provided with a closed pipe system comprising a stop valve, a pressure-reducing valve, degassing or exhaust gas containers and filters. The flowing or stationary contents of the system may be measured at its various points by a displaceable high-resolution gamma detector such as, for example, a $Ge(Li)$ detector.

This means that the reactor coolant always remains within closed pipes or paths and the radiation is measured through the walls of the pipes. The use of a known, high-resolution gamma detector such as, for example, a $Ge(Li)$ detector connected to a multichannel analyzer, is a prerequisite. The second requirement is the location of an easily accessible measuring locality which is preferably located in a laboratory, or in its immediate vicinity. The latter is not an absolute necessity since the transmission of the measured data creates no problems, and even a remote control of valves and detectors involves no technical problems. At any rate, it is advantageous to form a shunt to the actual primary circulation system in which only a fraction of the pumped coolant flows.

In order that the invention may be readily carried into effect, it will now be described with reference to the accompanying drawing, wherein the single FIGURE is a schematic diagram of an embodiment of the device of the invention for measuring the activity concentration in primary circulation systems of nuclear reactors.

In the example of the single FIGURE, the coolant is water, but the method of the invention may be utilized, with appropriate modification, also for liquid and gaseous coolants.

The primary circulation system is indicated in the Figure by the heavy broken line PK. A shunt N runs parallel to the line PK. The shunt N contains two stop valves V1 and V2 which may be multichannel valves. An intermediate circulation system Z is provided in the same manner and comprises a pressure reducing valve V3, a degassing or exhaust gas container E, a mechanical filter MF, an iodine filter IF, a pump P and the connecting pipe lines. The measuring points of a gamma detector GD, which is displaceable on a track DT, are indicated as D1, D2 and D3.

The measuring is effected with the device of the invention, as follows: The detector GD is in the position D1 for measuring the predominantly occurring radio nuclides. Nuclides are an atomic species in which all atoms have the same atomic number and mass number. The measuring may be effected at regular intervals or at intervals adapted to the respective measuring task. If the flow time of the coolant from the reactor core to the measuring location is about 5 to 10 minutes, it will still be possible to measure radio nuclides with a half wave time of about 1 minute. To accomplish this, the gamma detector is connected to a multichannel analyzer (not shown in the Figure). Its mode of operation is known and therefore need not be described in greater detail in this connection.

For measuring the activity concentration of radio nuclides of greater longevity such as, for example, $131_J$, $133_J$, $133_{Xe}$, $135_{Xe}$, both valves V1 and V2 are closed, so that the flow through the line is interrupted. The coolant in the length of pipe line between both valves V1 and V2 is then investigated, following the decay of the short-lived radio nuclide, and, with the detector in the position D1, is investigated with respect to the remaining longer-lived nuclides.

The wall thickness of the pipe line N and that of the pipe lines Z, may amount to several millimeters of steel, so that the coolant in the line may be under its normal working pressure. The fission gases which may be present thus remain dissolved, so that a measurement representative of the entire system is insured. The necessary diameter of the pipe line depends on the coolant activity; it may be small at high activity and large at only very low activity, so that the sensitivity of the detector will be well utilized.

The adjustment or adaptation of the cross-section of the pipe may vary from case to case. It may be possible, however, to install various cross-sections, without separating the pipe system. This is a construction feature which does not require inventive action in execution. An adjustment of the coolant activity, which is variable with respect to time, may also be effected by the provision of appropriate lead collimators between the pipe line and the detector. These have the function of fading out a more or less large cross-section from the coolant radiation.

In nuclear reactors which have defect-free and dust or contamination-free fuel cells, the activities of the corrosion products, in addition to the activities of the fission products, may also be measured at the described measuring position. When fuel cell defects occur, however, the primary coolants dominate the activities of the fission products to such an extent that, even when a semiconductor detector GD is used, a measurement of the activities of the corrosion products is possible only following the chemical separation or after a relatively long decay period which may last for days or weeks.

The aforedescribed difficulties may be eliminated by the branch line Z of the Figure. The primary coolant is freed from the fusion gases in the exhaust following a pressure reduction, via the valve V3, to atmospheric pressure. The gases thereafter pass into the exhaust gas system or, when necessary, into a special gas collecting apparatus. To accomplish this, a rinsing or flushing gas such as, for example, nitrogen, is utilized. The water is subsequently filtered through the mechanical filter MF, in order to insulate the suspended substances.

After the filter MF is removed via a rotating or shifting device, the activity of the suspended substance is determined by the gamma detector GD in the position D2. The filter MF itself may be removed for any subsequently desired chemical or radio-chemical investigations. In order to remove the iodine activities which interfere with the subsequent measuring, the filtrate is passed on through a selective iodine filter such as, for example, an anion exchanger or a silver cartridge.

The dissolved corrosion products activity which remains in the water is then measured in position D3. In order to avoid long measuring periods at light activities of the corrosion products, a selective concentration may be utilized in this case, for example, with specially prepared filters. After the measuring, the water may be passed back into the pipe line system N, via the pump P. Due to the slight residual activity to be expected, a discharge into the waste water is frequently possible through a line A.

If radio nuclides having very low activity concentrations such as, for example, $239_{Np}$, are to be measured, direct measuring in the aforedescribed manner becomes very difficult. To accomplish this, a degassed water sample is taken through a valve PE, so that the danger of a gas explosion is reliably avoided during this operation.

An illustrated position D4 of the detector permits a calibrated measuring with a radiation standard S. In this position, the detector is also available for other processes measuring the gamma spectrometrical activity not in direct connection with the coolant activity.

The illustrated device permits an extensively automated measuring process. For a better utilization of the detectors utilized, it is feasible and expedient to provide more such shunt circulation systems N and Z, which may all be measured with the same detector, but which function to determine various activity data with respect to flow and duration, as well as filter composition.

As hereinbefore mentioned, the detector GD is connected to a multichannel analyzer AD. The gamma detector GD may be connected to the analyzing device AD via an amplifier AM. The gamma spectra derived therefrom may be very rapidly analyzed with the assistance of an appropriate computer program, so that a reliable monitoring of fuel cells and primary coolant circulation systems is possible almost without the stress of radiation and without attendants. This is possible because, naturally, all lines with the exception of the measuring positions, are provided with a radiation protective or safety jacket (not shown in the Figure).

The invention is obviously not limited to the illustrated embodiment, and other embodiments of the shunt pipe line system are therefore included within the scope of the invention.

While the invention has been described by means of specific examples and in a special embodiment, we do not wish to be limited thereto, for obvious modifications will occur to those skilled in the art without departing from the spirit and scope of the invention.

We claim:

1. A device for measuring the activity concentration of radioactive fission and corrosion products in coolant primary circulation systems of nuclear reactor plants, comprising a shunt to the primary circulation system at said spaced locations of said shunt, a closed pipe system leading to and from said shunt at respective spaced locations of said shunt, said closed pipe system comprising stop valves, pressure reducing valve means, exhaust gas container means and filter means; and a displaceable high-resolution gamma detector in operative proximity with the closed pipe system for measuring activity concentration in said shunt between said stops valves and for measuring the contents in the closed pipe system means at different points of said closed pipe system.

2. A device as claimed in claim 1, wherein the gamma detector is a germanium (lithium) detector.

3. A device as claimed in claim 1, wherein the pipe system is adjustable in volume at individual measuring points to the expected activity range and to the sensitivity of the detector.

4. A device as claimed in claim 1, further comprising an amplifier and an analyzing device electrically connected to the gamma detector.

5. A device as claimed in claim 1, wherein the closed pipe system comprises a continuous path terminating at said stop valves for shutting it off and a parallel path extending from one of the stop valves to another, said filter means comprising a mechanical filter including selective filter means and an iodine filter, said closed pipe systems further comprising a pump.

6. A device as claimed in claim 5, further comprising a track, the gamma detector being displaceably mounted on the track for movement to selectable individual measuring points therealong adjacent the filter means and the like in the parallel path.

7. A device as claimed in claim 6, further comprising a plurality of holders each at a corresponding one of the measuring points, the gamma detector engaging a holder at each measuring point.

8. A device as claimed in claim 6, further comprising a radiation standard for rapid readjustment of the gamma detector positioned adjacent the track.

9. A device as claimed in claim 5 comprising means for moving said detector to a position to measure activity concentration of suspended substance in said filter means and to measure activity concentration in said closed system at a position after the fluid in said closed system has passed through said exhaust container means and said mechanical filter and iodine filter.

* * * * *